(12) United States Patent
Govari et al.

(10) Patent No.: US 12,533,186 B2
(45) Date of Patent: Jan. 27, 2026

(54) METHOD AND SYSTEM FOR OPTIMIZING RETURN ELECTRODE LOCATION ON THE BODY FOR IRREVERSIBLE ELECTROPORATION (IRE) PROCEDURES

(71) Applicant: Biosense Webster (Israel) Ltd., Yokneam (IL)

(72) Inventors: Assaf Govari, Haifa (IL); Andres Claudio Altmann, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 1028 days.

(21) Appl. No.: 17/559,433

(22) Filed: Dec. 22, 2021

(65) Prior Publication Data
US 2023/0190371 A1 Jun. 22, 2023

(51) Int. Cl.
*A61B 18/16* (2006.01)
*A61B 18/12* (2006.01)
*A61B 18/14* (2006.01)
*A61B 18/00* (2006.01)

(52) U.S. Cl.
CPC .......... *A61B 18/16* (2013.01); *A61B 18/1206* (2013.01); *A61B 18/1492* (2013.01); *A61B 2018/00351* (2013.01); *A61B 2018/00511* (2013.01); *A61B 2018/00577* (2013.01); *A61B 2018/00613* (2013.01); *A61B 2018/00773* (2013.01); *A61B 2018/167* (2013.01)

(58) Field of Classification Search
CPC . A61B 18/1206; A61B 18/1492; A61B 18/16; A61B 2018/00351; A61B 2018/00357; A61B 2018/00511; A61B 2018/00577; A61B 2018/00613; A61B 2018/00773; A61B 2018/0088; A61B 2018/1253; A61B 2018/167
See application file for complete search history.

(56) References Cited

U.S. PATENT DOCUMENTS

| | | | |
|---|---|---|---|
| 8,456,182 B2 | 6/2013 | Bar-Tal et al. | |
| 2013/0138097 A1* | 5/2013 | Mathur | A61B 18/1233 606/35 |
| 2018/0184982 A1 | 7/2018 | Basu et al. | |
| 2019/0201090 A1* | 7/2019 | Shelton, IV | A61B 17/07207 |

(Continued)

FOREIGN PATENT DOCUMENTS

| | | |
|---|---|---|
| CN | 113100916 A | 7/2021 |
| EP | 4166106 A1 | 4/2023 |
| WO | 2022173939 A1 | 8/2022 |

OTHER PUBLICATIONS

Extended European Search Report dated May 12, 2023, from corresponding EP Application No. 22215243.1.

*Primary Examiner* — Khadijeh A Vahdat

(57) ABSTRACT

The present disclosed subject matter provides a return electrode, such as a body surface electrode, which includes an accelerometer, for detecting movement of the body at and proximate to the location of the return electrode. The body movement results from pulses from an Irreversible Electroporation (IRE) pulse generator which are delivered to the return electrode, by a pulse delivery electrode. The data associated with the body movement at each location on the body of the return electrode, is used to determine suitable, and in some cases optimal, locations for return electrodes for IRE procedures.

10 Claims, 3 Drawing Sheets

(56) References Cited

U.S. PATENT DOCUMENTS

2021/0161592 A1  6/2021  Altmann
2021/0299453 A1  9/2021  Govari et al.
2022/0117655 A1  4/2022  Govari et al.

* cited by examiner

METHOD AND SYSTEM FOR OPTIMIZING RETURN ELECTRODE LOCATION ON THE BODY FOR IRREVERSIBLE ELECTROPORATION (IRE) PROCEDURES

TECHNICAL FIELD

The present disclosure relates generally to irreversible electroporation (IRE) systems, and particularly to methods and systems for electrodes used therewith.

BACKGROUND OF THE DISCLOSURE

Irreversible electroporation (IRE) is a soft tissue ablation technique that applies short pulses of strong electrical fields to create permanent and hence lethal nanopores in the cell membrane, thus disrupting the cellular homeostasis (internal physical and chemical conditions). Cell death following IRE results from apoptosis (programmed cell death) and not necrosis (cell injury, which results in the destruction of a cell through the action of its own enzymes) as in other thermal or radiation based ablation techniques.

Unipolar irreversible electroporation (IRE) systems typically operate at high currents, for example, approximately 30 Amperes and higher. Some IRE procedures use unipolar IRE pulses, which are returned to the IRE generator via a return electrode, e.g., an electrode coupled to a backpatch outside the body of the subject. These pulses are designed to be balanced, and as such should have zero DC Current absorbed by the subject.

BRIEF DESCRIPTION OF THE DRAWINGS

The present disclosure will be more fully understood from the following detailed description of the examples thereof, taken together with the drawings, wherein corresponding or like numerals or characters indicate corresponding or like components, in which.

DETAILED DESCRIPTION OF EXAMPLES

Figure 1:
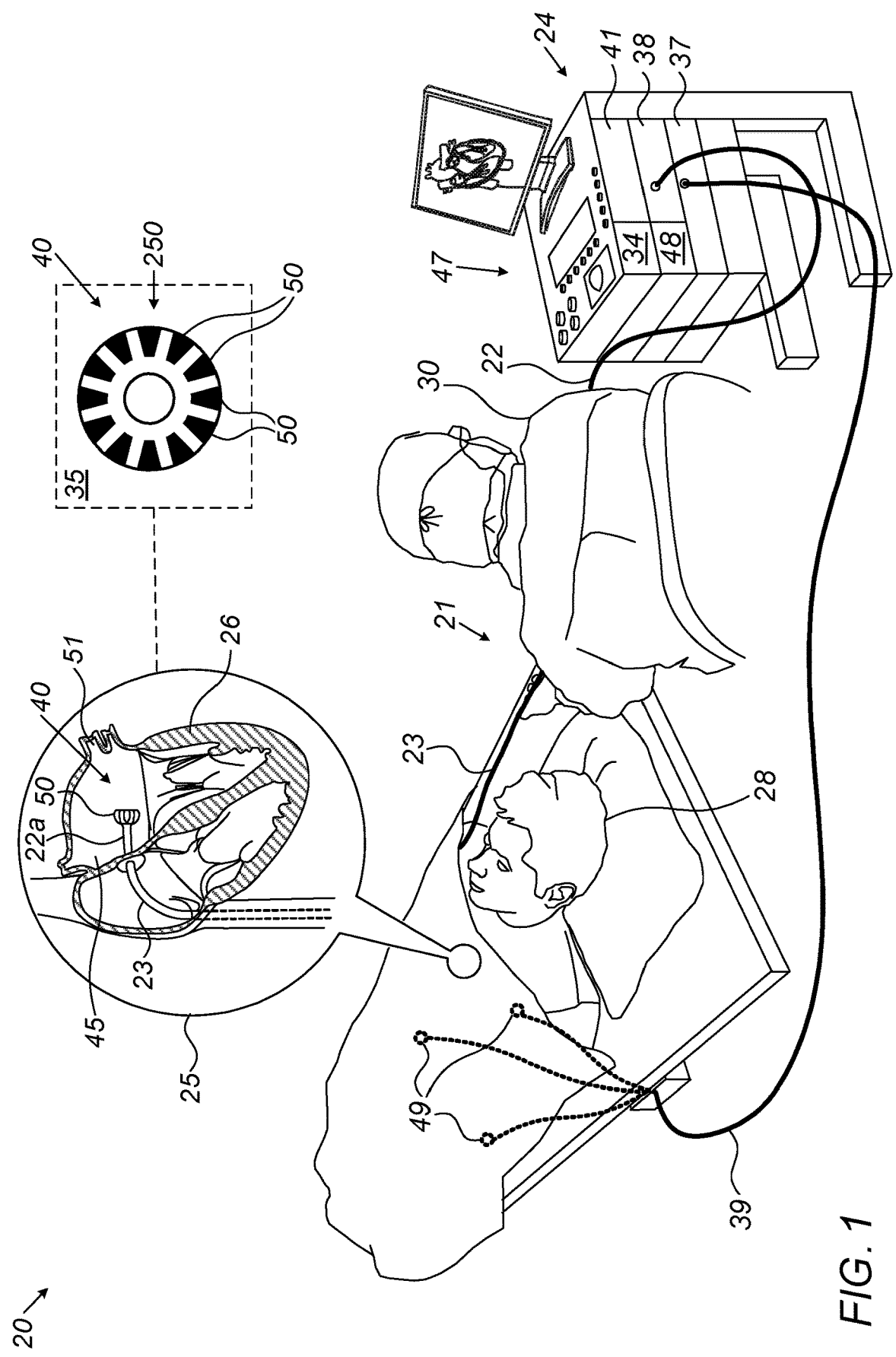
FIG. 1 is an illustration of example irreversible electroporation (IRE) system in use with a patient.

We have observed that the location of the backpatch of the subject undergoing a full IRE ablation has an impact on muscle spasms during such ablation. It is believed that certain locations on the body provide a better return path to the backpatch return electrode such that there is little to no muscle spasms or movement of the subject. Accordingly, we have devised the following subject matter of our invention which is described and illustrated herein. In particular, we have devised a body surface electrode, which is a return electrode, for example, a patch, and, a method for its use to determine one or more suitable locations for placing the patch on the patient for an irreversible electroporation (IRE) procedure, also known as a "full" IRE procedure. The present disclosed subject matter provides a body surface electrode, which functions as a return electrode, and which detects muscle contractions or spasms, caused by the high currents of unipolar IRE, coupled with the location on the body where the body surface electrode is attached or otherwise positioned.

The present disclosed subject matter provides a return electrode, such as a body surface electrode, which includes an accelerometer, for detecting movement of the body at and proximate to the location of the return electrode. The body movement results from pulses from an Irreversible Electroporation (IRE) pulse generator, which are delivered to the return electrode, by a pulse delivery electrode. The data associated with the body movement at each location on the body of the return electrode, is used to determined suitable, and in some cases optimal, locations for return electrodes for IRE procedures.

The present disclosed subject matter provides a body surface electrode, such as a patch, which includes an accelerometer, configured to measure movement from muscle contractions or spasms, caused by a series of "test" pulses, administered prior to a "full" IRE procedure. The movement data from each tested location for the respective body surface electrode is analyzed, by a processor, computer, or the like. This analysis determines locations with the least or minimal amount of movement, from IRE pulse-induced muscle contractions or spasms. These locations are the most suitable or optimal locations for placement of the body surface electrode during a "full" IRE procedure, such that the "full" IRE procedure is most effective.

OVERVIEW

Irreversible electroporation (IRE) is a predominantly non-thermal process, which causes an increase of the tissue temperature by, at most, a few degrees for a few milliseconds. It thus differs from RF (radio frequency) ablation, which typically raises the tissue temperature by between 20 and 70° C. and destroys cells through heating.

Some IRE schemes are unipolar, in the sense that pulses are applied, for example, between two unipolar electrodes, one of a catheter inside the body, typically in an organ such as heart or kidney, and the other, a return electrode, attached to the outside skin surface of the patient, typically at the back, closest to the catheter. The electrode(s) are typically on a body surface electrode, for example, in the form of a back patch, which, for example, adhesively attaches to the skin of the patient.

In order for the IRE pulses to generate the required nanopores in tissue, the field strength E of the pulses should exceed a tissue-dependent threshold $E_{th}$. Thus, for example, for heart cells the threshold is approximately 500 V/cm, whereas for bone it is 3000 V/cm. These differences in threshold field strengths enable IRE to be applied selectively to different tissues.

When performing unipolar IRE, it is important that the body surface electrode (e.g., patch or backpatch), the return electrode, be positioned on the body, at locations where movement of the underlying tissue, such as from muscle contractions and muscle spasms, caused by the pulses, as they travel through the body, from the delivery electrode to the return electrode, is minimal or not present.

Examples of the present disclosed subject matter that are described herein provide body surface electrodes, which are return electrodes, which include accelerometers. The accelerometers are used to determine suitable locations on a patient's body for body surface electrodes used in "full" unipolar IRE procedure. The accelerometers measure movement and the amount thereof, of the location of the body where the body surface electrode is attached or otherwise positioned. The movement is typically caused by muscle contractions and/or spasms, resulting from the "test" IRE pulses traveling through the body, from a composite or delivery electrode to the body surface electrode, functioning as a return electrode, to return current, from the delivered pulse, to the IRE generator, through an electrical line.

System Description

FIG. 1 is a schematic, pictorial illustration of a catheter-based irreversible electroporation (IRE) system 20, in accordance with an example of the disclosed subject matter. The system 20 comprises a catheter 21, wherein a shaft 22 of the catheter 21 is inserted by a physician 30 through the vascular system of a patient 28 through a sheath 23. The physician then navigates a distal end 22a of shaft 22 to a target location inside a heart 26 of the patient.

Once the distal end 22a of the shaft 22 has reached the target location, physician 30 retracts sheath 23 and expands balloon 40, typically by pumping saline into balloon 40. Physician 30 then manipulates shaft 22 such that electrodes 50 disposed on the balloon 40 catheter engage an interior wall of a PV ostium 51 to apply high-voltage PFA pulses via electrodes 50 to ostium 51 tissue.

As seen in inset 25, distal end 22a is fitted with an expandable balloon 40 comprising multiple equidistant IRE electrodes 50. Due to the flattened shape of the distal portion of balloon 40, the distance between adjacent electrodes 50 remains approximately constant even where electrodes 50 cover the distal portion. Balloon 40 configuration therefore allows more effective electroporation (e.g., with approximately uniform electric field strength) between adjacent electrodes 50, as in inset 35.

Certain aspects of inflatable balloons are addressed, for example, in U.S. Patent Application Publication No. US 2018/0184982 A1, titled "Hybrid Balloon Basket Catheter", which is assigned to the assignee of the present patent application, the disclosure of which is incorporated herein by reference.

In the example described herein, which is a unipolar IRE system, catheter 21 may be used for any suitable diagnostic and/or therapeutic purpose, such as electrophysiological sensing and/or the aforementioned IRE isolation of PV ostium 51 tissue in left atrium 45 of heart 26.

The proximal end of catheter 21 is connected to switching assembly 48 comprised in console 24, with circuitry for creating an effective composite electrode 250 by short-circuiting electrodes 50 one to the other (e.g., using switches of assembly 48). Electrodes 50 are connected to the switching assembly 48 PFA by electrical wiring (shown in FIG. 2) running in shaft 22 of catheter 21. Console 24 further comprises a PFA pulse generator 38, to which assembly 48 is connected, where generator 38 is configured to apply the PFA pulses between composite electrode 250 and a skin patch electrode (shown in FIG. 2), which serves as a return electrode.

An IRE pulse generator similar to the PFA pulse generator 38 is described in U.S. patent application Ser. No. 16/701,989, filed Dec. 3, 2019, titled "Pulse Generator for Irreversible Electroporation", and issued as U.S. Pat. No. 11,540,877, which is assigned to the assignee of the present patent application and whose disclosure is incorporated herein by reference. The pulses generated by the pulse generator 38 are balanced, i.e., they have zero DC.

A memory 34 of console 24 stores IRE protocols comprising PFA pulse parameters, such as peak-to-peak voltage and pulse width, as described for FIG. 1.

Console 24 comprises a processor 41, typically a general-purpose computer, with suitable front end and interface circuits 37 for receiving signals from catheter 21 and from external electrodes 49, which are typically placed around the chest of patient 28. For this purpose, processor 41 is connected to external electrodes 49 by wires running through a cable 39.

During a procedure, system 20 can track the respective locations of electrodes 50 inside heart 26 using the Active Current Location (ACL) method, provided by Biosense-Webster (Irvine, California), which is described in U.S. Pat. No. 8,456,182, whose disclosure is incorporated herein by reference.

In some examples, the physician 30 can modify, from a user interface 47, any of the parameters of the unipolar IRE protocol used with composite electrode 250. User interface 47 may comprise any suitable type of input device, e.g., a keyboard, a mouse, or a trackball, among others.

Processor 41 is typically programmed in software to carry out the functions necessary to perform IRE procedures, including those procedures performed by unipolar IRE. The software may be downloaded to the computer in electronic form, over a network, for example, or it may, alternatively or additionally, be provided and/or stored on non-transitory tangible media, such as magnetic, optical, or electronic memory.

In particular, processor 41 runs a dedicated protocol as disclosed herein, which enables processor 41 to perform the disclosed steps, as further described below.

Determining Locations on the Body for Body Surface Electrodes (Return Electrodes)

Figure 2:
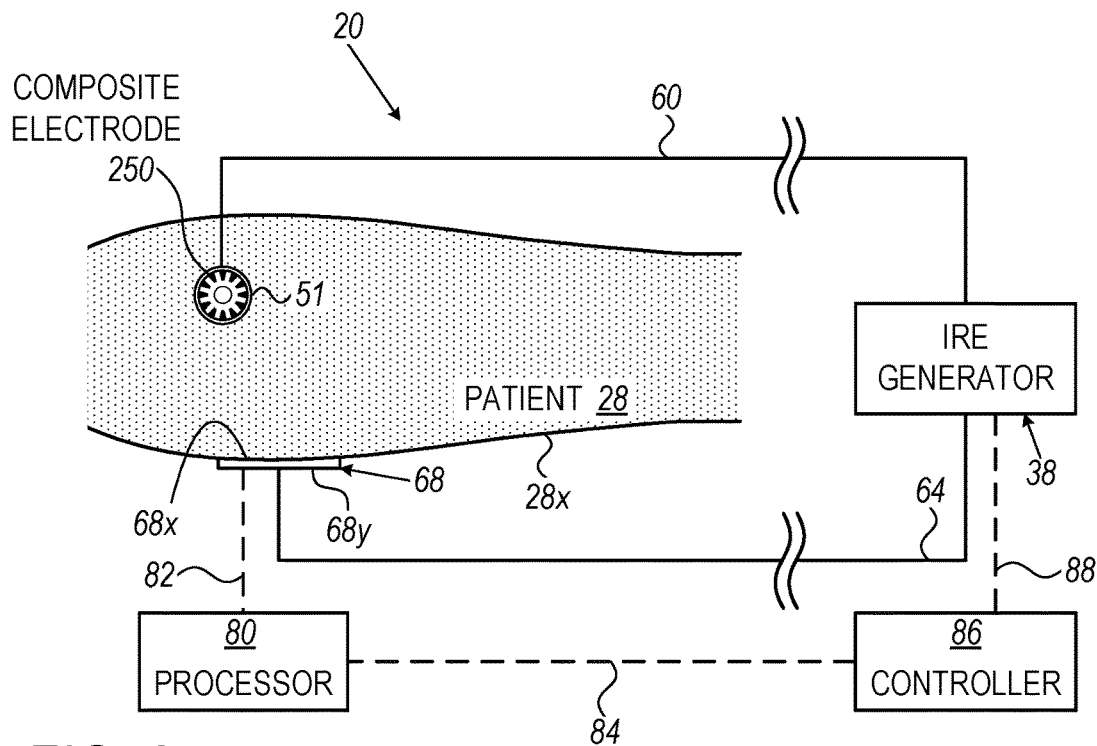
FIG. 2 is a diagram that schematically illustrates an example system in use with the disclosed subject matter, in accordance with an example of the present disclosure.

FIG. 2 shows a schematic, simplified pictorial diagram of the example system 20 in operation on a patient 28 or body, the terms "patient" and "body" used interchangeably herein. For example, the patient 28 is a human or other mammalian subject. The irreversible electroporation (IRE) catheter 40 of FIG. 1 ablating ostium 51 of a pulmonary vein (PV) with pulse trains of unipolar pulsed-field ablation (PFA) pulses (pulses of current (the pulses of current also known as pulsed current or current pulses, and these terms are used interchangeably herein), for example, as described in U.S. patent application Ser. No. 17/073,467, titled: "Using Unipolar Configuration For Irreversible Electroporation", and issued as U.S. Pat. No. 12,290,306, which is assigned to the assignee of the present patent application and whose disclosure is incorporated herein by reference.

Referring also to FIG. 1, the composite electrode 250, also known as a pulse delivery electrode, is in contact with ostium 51 over an entire circumference of the ostium. The composite or pulse delivery electrode 250 is connected via a cable 60 to switching assembly (of one or more switches) 48, where the separate wires of cable 60 that connect to electrodes 50 are short-circuited one with the other in the switching assembly 48, to create an effective composite or pulse delivery electrode 250. A single conductor (not shown) connects switching assembly 48 to one end of PFA generator 38, also known as an IRE generator, pulse generator, or generator, these terms are used interchangeably herein, and to the cable 60.

The other lead of PFA generator 38 is connected by a line 64 to an electrode 66 (FIG. 3) on a body surface electrode 68 or return electrode, for example, shown as a back patch, but is also suitable for attachment to the legs and other parts of the body. Hereinafter in this document, the terms "body surface electrode", "return electrode", "patch", and "back-patch", are used interchangeably herein, and are represented by the element number 68. The line 64 facilitates (e.g., carries) return current (from the delivered pulse(s)) from the electrode(s) 66 of the body surface electrode 68, to the IRE (PFA) generator 38. The IRE generator 38, switching box 48, cable 60 (including the single conductor), composite electrode 250, body surface electrode 68 via the return electrode 66, and return line 64 form an electrical circuit for pulse delivery to, and return from, the patient 28.

The body surface electrode 68 is attached to skin of the patient 28, for example, at an adhesive side 68x of the body surface electrode 68. The outer side 68y of the body surface electrode 68 is exposed to the ambient environment. As noted above, implementing unipolar PFA using the pulse delivery electrode 250 requires dedicated IRE protocols with suitable PFA pulses to be applied to the patient 28. In some examples, a provided PFA protocol divides (partitions) the PFA pulse delivery of a selected protocol into multiple pulse trains ("pulse bursts") with pauses between the pulse trains, for example, as described in U.S. patent application Ser. No. 16/701,989, filed Dec. 3, 2019, titled "Pulse Generator for Irreversible Electroporation", and issued as U.S. Pat. No. 11,540,877, which is assigned to the assignee of the present patent application. The pauses between the pulse trains permit muscle relaxation, if any contraction and/or spasm occurs.

Figure 3:
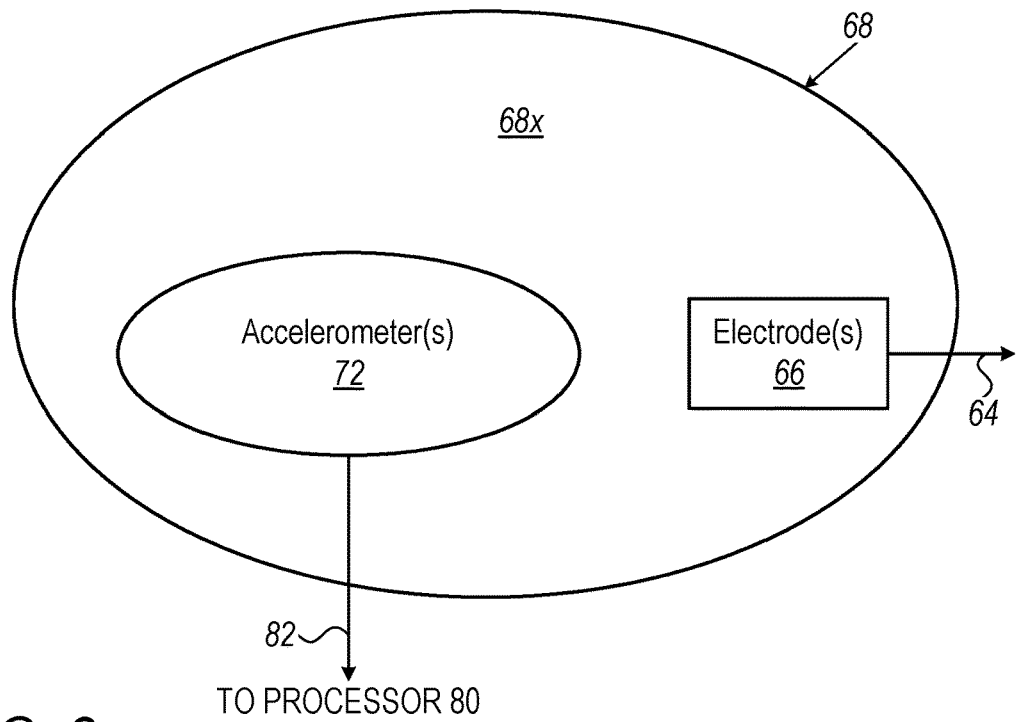
FIG. 3 is a schematic view of a body surface electrode in the form of a patch, in accordance with an example of the disclosed subject matter.

Turning also to FIG. 3, an electrode 66, formed by one or more electrodes, and which functions as a return electrode, is, for example, positioned on or otherwise coupled to, the adhesive or inner side 68x of the body surface electrode 68, e.g., patch. This electrode 66, as part of the patch 68, is typically attached to the patient 28, along the back 28x, legs, or other body portion of the patient 28. The adherence is, for example, by adhesives, so that the patch 68 is either self-attaching, or with other mechanical or chemical fasteners.

The body surface electrode 68, also includes one or more accelerometers 72, or other movement measuring devices. The accelerometer 72, representative of the one or more accelerometers on the body surface electrode, communicates with a processor 80, for example, over the line 82.

The processor 80 obtains accelerometer 72 data (also known as "movement data", the terms "accelerometer data" and "movement data" used interchangeably herein), for example, indicative of movement and/or the extent of the movement, by monitoring and/or poling the accelerometer 72 at intervals, or receiving transmissions of accelerometer data from the accelerometer 72 at intervals, with the accelerometer data typically obtained continuously. The processor 80 is programmed to analyze the movement data for movement and/or the extent of the movement of the body surface electrode 68, caused by the muscle contractions and/or muscle spasms resulting from the IRE pulses, for example, "test" pulses. The processor 80 may be programmed to assign a score to the movement. For example, the greater the movement, the higher the score, for the body surface electrode at the specific location. For example, the processor may also be programmed to analyze the scores, including by comparison, to determine suitable, which may include optimal, locations on the body for placement of the body surface electrode 68 for a "full" IRE procedure. The processor 80, for example, is also associated with memory and storage, with the storage supporting databases and the like.

The IRE generator 38, operates, for example, for a "full" IRE procedure at approximately: a frequency of 1 Mega Hertz (MHz), a voltage of 2 kilo Volts (kV), and, an impedance of 30 Amperes (A), and the IRE generator 38, is, for example, operable at approximately 5 nF (nano Farads). In the case of a "test" IRE procedure with "test" pulses, the IRE generator 38 operates similar to that of the "full" IRE procedure, but the "test" pulses are such that one or more of the operational parameters, such as pulse width, frequency, and/or amplitude, is reduced. By operating with one or more reduced parameters, the "test" IRE procedure operates in a safe range.

A controller 86 communicates with the IRE generator 38 over a line 88. The controller 86, for example, signals the IRE generator 38 to generate "test" pulses (for example, in a "test" pulse protocol) when determining suitable or optimal locations on the body 28 for body surface electrode 68 placement in a "full" IRE procedure, and to generate a pulse sequence or protocol for a "full" IRE procedure. The controller includes processors, memory and storage, for operating with the processor 80, as detailed below, and performing other processes for the system 20, as detailed below.

The controller 86 also communicates with the IRE generator 38 via the line 88, to signal the start and stop periods for the "test" pulse(s) and protocols therefor, and to signal the IRE generator 38 to start and terminate one or more pulses and/or pulse sequences or protocols for a "full" IRE procedure. The controller 86 also, for example, signals the IRE Generator 38 to immediately terminate pulse generation, either automatically in accordance with a program, or having received a command from an operator or other machine or device in communication with the controller 86.

The processor 80 may also communicates with the controller 86, and vice versa, over a line 84, representative of wired and/or wireless communications. For example, the processor 80 may provide movement data, as obtained from the accelerometer(s) 72, for each body surface electrode 68 at each tested location on the body 28. The processor 80, as discussed above, and/or the controller 86 analyzes the movement data to determine suitable, and in some cases optimal, locations on the body 28 for the body surface electrode 68 for "full" IRE procedures. Also, for example, the controller 86 may communicate to the processor 80, information about the sequence or protocol of "test" pulses, such as the time they will be generated, the generated frequency and intensity, and the same or similar information for the "full" IRE procedure. The processor 80 may also signal the controller 86 to shut off the IRE generator 38, and instantly terminate pulse generation, should the processor 80 detect an abnormality with the electrode 66, the accelerometer 72 or the like.

Turning to the body surface electrode 68, for example, in the form of a patch 68 of FIG. 3, on the adhesive side 68x of the patch 68a, which contacts the skin, is a single electrode 66 (representative of the one or more electrodes), and an accelerometer 72 (representative of one or more accelerometers). The electrode 66, as supported on the patch 68, is a return electrode for the pulses from the composite electrode 250 to the IRE generator 38. The accelerometer 72 communicates with the processor 80, over the line 84 (wired link) or a wireless link, so that movement data, measured by the accelerometer 72, is obtained by the processor 80, either by pushing data to the processor 80, or the processor 80 pulling data from the accelerometer 72.

The processor 80 obtains the movement data from the accelerometer 72, for example, by the accelerometer 72 either sending signals indicative of measured movement, to the processor 80, either continuously or at various time intervals including randomly, and, either automatically, or when triggered by the processor 80. Alternately, the processor 80 monitors the accelerometer 72, for example, monitoring the data of measured movement, which is outputted by the accelerometer 72, or obtained by the processor 80 polling the accelerometer 72. The aforementioned monitoring, triggering and/or polling is, for example, continuous, and may be constant or in intervals, equally spaced apart in time, or random.

Figure 4:
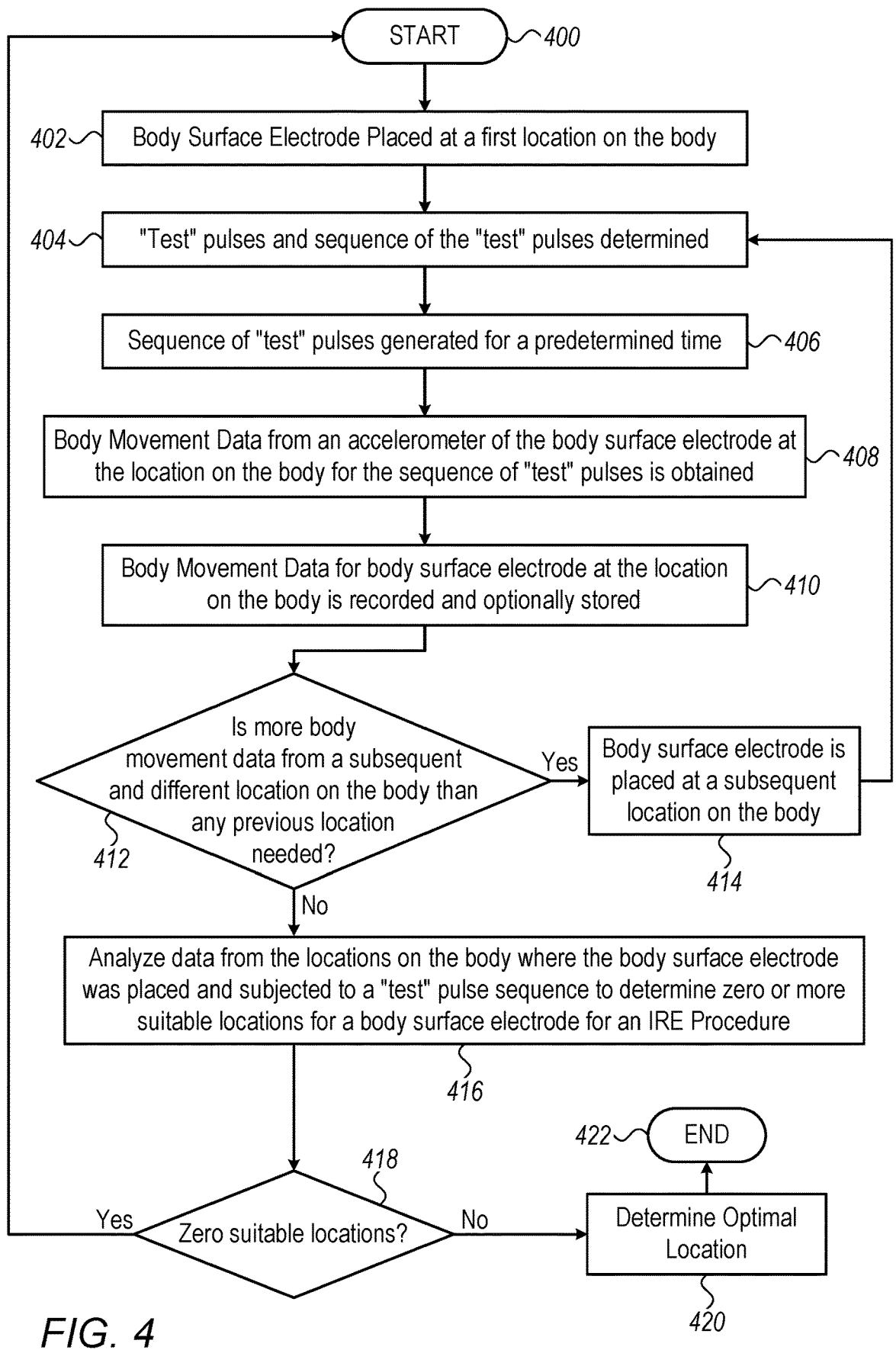
FIG. 4 is a flow diagram of an example process based on accelerometer data to determine the optimal location of the body surface electrode on a patient's body for a "full" IRE procedure, in accordance with the disclosed subject matter.

FIG. 4 is a flow diagram of an example process performed by the processor 80 that schematically illustrates a method for using patch 68 and series of "test" pulses, to determine suitable, including optimal, locations on the body for body surface electrode 68 placement, for example, for a "full" IRE procedure. The process is, for example, performed automatically and in real time, and may include manual subprocesses. The process may be performed as long as desired.

The process begins at a START block 400, where, for example, the IRE system 20 is in place and ready for use with a patient 28. At block 402, the process begins, as the body surface electrode 68 is placed at a location on the body 28, such as a first location. At block 404, which may be contemporaneous or simultaneous with, or interchanged with block 402, the controller 86 determines a sequence or protocol of "test" pulses, including the number of pulses, the intensity and the frequency of the pulses.

A series or sequence of "test" pulses, as part of a protocol, is generated by the IRE Generator 38, at block 406. At block 408, the accelerometer 72 detects body movements, which may be, for example, muscle movements in the form of muscle contractions and/or muscle spasms, resulting from the "test" pulses traveling through the body, from the delivery electrode 250 to the electrode 66 on the body surface electrode 68. The data associated with the body movements, as detected by the accelerometer 72, at the location (which may also include locations on the body proximate to the location of the body surface electrode 68) of the body 28, is obtained from the accelerometer 72 by the processor 80, as detailed above.

The obtained accelerometer data (body movement data for the location of the body surface electrode 68 subject to the "test" pulses) is recorded, and typically stored, at block 410. The storage is in a database, for example, associated with the processor 80, and which may be in the controller 86.

The process moves to block 412, where it is determined whether more data is needed, for example, data from at least two locations of the body surface electrode 68 on the body, as points of comparison. However, data from a single body surface electrode location on the body 28 may be sufficient, should a threshold value or score for acceptable body movement be programmed into the processor 80 or controller 86. Should more movement data be needed from subsequent locations of the body surface electrode, after data from a first location of the body surface electrode on the body has been obtained, the process moves to block 414.

At block 414, the body surface electrode 68, now removed from the previous location, or a new body surface electrode (with the previous body surface electrode removed from the body), is placed at a subsequent location on the body, for example, different than any previous location on the body 28 where the body surface electrode 68 was placed (positioned). From block 414, the process moves to block 404, from where it resumes, in accordance with that detailed above.

Returning to block 412, should more movement data from more locations of the body surface electrode on the body not be needed, the process moves to block 416. At block 416, movement data from the locations of the body surface electrodes is analyzed. The analysis determines whether there are suitable locations (zero or more) for the body surface electrode for a "full" IRE procedure. In the case of zero suitable locations, although movement data was obtained for the locations of the body surface electrode on the body, the movement exceeded a predetermined movement threshold or score, programmed into the processor 80 or controller 86, such that zero or none of the locations were sufficient for a body surface electrode for a "full" and subsequent (after the test IRE procedure using the "test" pulses) IRE procedure.

The process moves to block 418. At block 418, should the analysis have determined zero or no suitable locations on the body for a body surface electrode for a "full" IRE procedure, the process returns to block 400, from where it resumes, as described above.

However, at block 418, should there be one or more suitable locations determined, the process moves to block 420, where at least one optimal location on the patient's body for the body surface electrode for the "full" IRE procedure is indicated to the operator. The optimal location is selected from one or more locations of the patch electrode 68 with the least amount of body movement (from the g-sensor 72 on the patch electrode adhered to the body) when the test IRE pulse is applied. That is, at each location on the body, the system stores the movement data at each application of the test IRE pulses and indicates to the operator a location with the least amount of body movements during the IRE test pulses.

Alternatively, the system may utilize a predetermined movement threshold and when the movement of the patch electrode 68 at an operator selected location is greater than the predetermined threshold at step 412, the method indicates to the user to begin a test sequence at a different location. A location of the body patch 68 is selected when the body movement (via g-sensor 72) during the test IRE pulses is less than the predetermined threshold. At this point, the system would inform the operator via the display or audio output of system 24 that this selected location is "optimal" for IRE ablation therapy. At this determination step 420 of the optimal location, the process moves to block 422 where it ends. The process of determining an optimal location may be repeated for as long as desired.

Typically, the processor 80 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Example 1

A system (20) for determining placement of a body surface electrode (68) for an irreversible electroporation (IRE) procedure. The system (20) comprises: a body surface electrode (68) comprising: 1) at least one electrode (66) configured to electrically couple with a pulse delivery electrode (250) in communication with an IRE generator (38), the at least one electrode (66) in communication with the skin of a patient (28), and the at least one electrode (66) for communication with the IRE generator (38) to return current to the IRE generator (38); and, 2) at least one movement measuring device (72); and, a processor (80) in communication with the at least one movement measuring device (72). The processor (80) is programmed to: obtain data corresponding to body movements measured by the movement measuring device (72) of the body surface electrode (68) at least proximate to the location on the body of the body surface electrode (68), the body movements including muscle movements resulting from at least one pulse from the IRE generator (38) delivered to the body by the pulse delivery electrode (250) and received by the at least one electrode (66) of the body surface electrode (68).

Example 2

The system (20) according to Example 1, wherein the processor (80) is additionally programmed to: obtain data corresponding to body movements measured by the movement measuring device (72) of the body surface electrode (68), from multiple locations where the body surface electrode (68) is placed on the body, where each of the multiple locations was subjected to at least one pulse from the IRE generator (38).

Example 3

The system (20) according to Example 1 or Example 2, wherein the processor (80) is additionally programmed to: analyze the data corresponding to the body movements measured by the movement measuring device (72) of the body surface electrode (68), from the multiple locations where the body surface electrode (68) was placed on the body, to determine zero or more suitable location for body surface electrodes for at least one subsequent IRE procedure.

Example 4

The system (20) according to any one of Example 1 to Example 3, wherein the zero or more suitable locations includes at least one location which is an optimal location for at least one body surface electrode for at least one subsequent IRE procedure.

Example 5

The system (20) according to any one of Example 1 to Example 4, wherein the at least one movement measuring device (72) includes at least one accelerometer (72).

Example 6

The system (20) according to any one of Example 1 to Example 5, wherein the muscle movements include one or more of muscle contractions and/or muscle spasms resulting from the at least one pulse from the IRE generator (38) delivered to the body by the pulse delivery electrode (250) and received by the at least one electrode (66) of the body surface electrode (68).

Example 7

A method for determining a suitable location on the body for a body surface electrode (68) for an irreversible electroporation (IRE) procedure comprising: a) providing a body surface electrode (68) for communicating with the skin of a patient (28), the body surface electrode (68) comprising: at least one electrode (66) configured to electrically couple with a pulse delivery electrode (250) in communication with an IRE generator (38), the at least one electrode (66) in communication with the skin of a patient (28), and the at least one electrode (66) for communication with the IRE generator (38) to return current to the IRE generator (38); and, at least one movement measuring device (72); b) placing the body surface electrode (68) into communication with the skin of a patient (28) at a first location on the body of the patient (28), and the body surface electrode (68) is coupled with a pulse delivery electrode (250) to receive pulses from the IRE generator (38) through the pulse delivery electrode (250); c) the body surface electrode (68) at the first location receiving at least one pulse generated by the IRE generator (38), via the pulse delivery electrode (250); d) obtaining, from the at least one movement measuring device (72), first data as to movement of the body at least proximate to the first location of the body surface electrode (68) in communication with the skin of the patient (28) on the body, the movement of the body caused by the at least one pulse from the pulse delivery electrode (250) to the body surface electrode (68) at the first location; e) placing the body surface electrode (68) into communication with the skin of a patient (28) at a second location on the body of the patient (28) which is a different location than the first location, and the body surface electrode (68) is coupled with a pulse delivery electrode (250) to receive pulses from the IRE generator (38) through the pulse delivery electrode (250); f) the body surface electrode (68) at the second location receiving at least one pulse generated by the IRE generator (38), via the pulse delivery electrode (250); g) obtaining, from the at least one movement measuring device (72), second data as to movement of the body at least proximate to the second location of the body surface electrode (68) in communication with the skin of the patient (28) on the body, the movement of the body caused by the at least one pulse from the pulse delivery electrode (250) to the body surface electrode (68) at the second location; and, h) analyzing the first data and the second data to determine at least one location on the body for a body surface electrode for the IRE procedure.

Example 8

The method according to Example 7, wherein the at least one location includes an optimal location.

Example 9

The method according to Example 7 or Example 8, wherein the at least one pulse includes a plurality of pulses for causing movement of the body by inducing one or more of muscle contractions and/or muscle spasms.

Example 10

A body surface electrode (68) comprising: at least one electrode (66) configured to electrically couple with a pulse delivery electrode (250) in communication with an IRE generator (38), the at least one electrode (66) in communication with the skin of a patient (28), and the at least one electrode (66) for communication with the IRE generator (38) to return current to the IRE generator (38); and, at least one movement measuring device (72) configured to measure movement of the body surface electrode (68) at a location on the body.

Example 11

The body surface electrode (68) according to Example 10, wherein the at least one movement measuring device (72) is configured for communicating data associated with the measured movements of the body surface electrode (68) at a location on the body to a processor (80).

Example 12

The body surface electrode (68) according to Example 10 or Example 11, wherein the at least one movement measuring device (72) includes at least one accelerometer (72).

Example 13

The body surface electrode (68) according to any one of Example 10 to Example 12, wherein the at least one accelerometer (72) includes a plurality of accelerometers (72).

Although the examples described herein mainly address electrode contacts with a patient's skin for a backpatch, the methods and systems described herein can also be used in other applications, such as in contact detection, between electrodes and surfaces.

It will thus be appreciated that the examples described above do not limit the present disclosure to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for determining placement of a body surface electrode for an irreversible electroporation (IRE) procedure, the system comprising:
a body surface electrode comprising:
at least one electrode configured to electrically couple with a pulse delivery electrode in communication with an IRE generator, the at least one electrode in communication with skin of a patient body, and the at least one electrode for communication with the IRE generator to return current to the IRE generator; and
at least one movement measuring device; and
a processor in communication with the at least one movement measuring device, the processor programmed to:
obtain data corresponding to body movements measured by the movement measuring device of the body surface electrode, from multiple locations where the body surface electrode is placed on the patient body, the body movements including, at each of the multiple locations, muscle movements resulting from at least one pulse from the IRE generator delivered to the patient body by the pulse delivery electrode and received by the at least one electrode of the body surface electrode; and
analyze the data corresponding to the body movements measured by the movement measuring device of the body surface electrode, from the multiple locations where the body surface electrode was placed on the patient body, to determine zero or more suitable locations for the body surface electrode for at least one subsequent IRE procedure.

2. The system of claim 1, wherein the zero or more suitable locations includes at least one location which is an optimal location for at least one body surface electrode for at least one subsequent IRE procedure.

3. The system of claim 1, wherein the at least one movement measuring device incudes at least one accelerometer.

4. The system of claim 3, wherein the muscle movements include one or more of muscle contractions and/or muscle spasms resulting from the at least one pulse from the IRE generator delivered to the patient body by the pulse delivery electrode and received by the at least one electrode of the body surface electrode.

5. A method for determining a suitable location on a patient body of a patient for a body surface electrode for an irreversible electroporation (IRE) procedure comprising:
providing a body surface electrode for communicating with skin of the patient, the body surface electrode comprising:
at least one electrode configured to electrically couple with a pulse delivery electrode in communication with an IRE generator, the at least one electrode in communication with the skin of the patient, and the at least one electrode for communication with the IRE generator to return current to the IRE generator; and
at least one movement measuring device;
placing the body surface electrode into communication with the skin of the patient at a first location on the patient body, and the body surface electrode is coupled with the pulse delivery electrode to receive pulses from the IRE generator through the pulse delivery electrode;
the body surface electrode at the first location receiving at least one test pulse generated by the IRE generator, via the pulse delivery electrode;
obtaining, from the at least one movement measuring device, first data as to movement of the patient body at least proximate to the first location of the body surface electrode in communication with the skin of the patient on the patient body, the movement of the patient body caused by the at least one test pulse from the pulse delivery electrode to the body surface electrode at the first location;
placing the body surface electrode into communication with the skin of the patient at a second location on the patient body which is a different location than the first location, and the body surface electrode is coupled with the pulse delivery electrode to receive pulses from the IRE generator through the pulse delivery electrode;
the body surface electrode at the second location receiving at least one test pulse generated by the IRE generator, via the pulse delivery electrode;
obtaining, from the at least one movement measuring device, second data as to movement of the patient body at least proximate to the second location of the body surface electrode in communication with the skin of the patient on the patient body, the movement of the patient body caused by the at least one test pulse from the pulse delivery electrode to the body surface electrode at the second location; and
analyzing the first data and the second data to determine at least one location on the patient body for the body surface electrode for the IRE procedure.

6. The method of claim 5, wherein the at least one location includes an optimal location.

7. The method of claim 6, wherein the at least one pulse includes a plurality of pulses for causing movement of the patient body by inducing one or more of muscle contractions and/or muscle spasms.

8. A body surface electrode comprising:
- at least one electrode configured to electrically couple with a pulse delivery electrode in communication with an irreversible electroporation (IRE) generator, the at least one electrode in communication with skin of a patient body, and the at least one electrode for communication with the IRE generator to return current to the IRE generator; and
- at least one movement measuring device configured to measure movement of the body surface electrode at one or more locations on the patient body, the at least one movement measuring device being configured for communicating data associated with the measured movements of the body surface electrode at the one or more locations on the patient body to a processor that is programmed to analyze the data in relation to a predetermined threshold to determine zero or more suitable locations for the body surface electrode for at least one subsequent IRE procedure.

9. The body surface electrode of claim 8, wherein the at least one movement measuring device includes at least one accelerometer.

10. The body surface electrode of claim 9, wherein the at least one accelerometer includes a plurality of accelerometers.

* * * * *